United States Patent [19]

Kelly

[11] 4,090,497

[45] May 23, 1978

[54] SOLAR ENERGY SYSTEM

[76] Inventor: Donald F. Kelly, P.O. Box 62215, Sunnyvale, Calif. 94088

[21] Appl. No.: 680,913

[22] Filed: Apr. 28, 1976

[51] Int. Cl.$^2$ .............................................. F24J 3/02
[52] U.S. Cl. .................................... 126/271; 126/270; 237/1 A
[58] Field of Search ............... 126/270, 271; 237/1 A; 60/641; 49/74, 76, 81, 116

[56] References Cited

U.S. PATENT DOCUMENTS

| 585,273 | 6/1897 | Lathrop | 49/81 X |
|---|---|---|---|
| 2,288,465 | 6/1942 | Knudsen | 126/270 |
| 2,918,709 | 12/1959 | Concoran | 126/270 X |
| 3,863,621 | 2/1975 | Schoenfelder | 126/270 |
| 3,875,925 | 4/1975 | Johnston | 126/270 |
| 3,919,998 | 11/1975 | Parker | 126/270 |
| 4,007,776 | 2/1977 | Alkasab | 237/1 A X |
| 4,014,313 | 3/1977 | Pedersen | 126/270 |

Primary Examiner—William F. O'Dea
Assistant Examiner—Larry Jones

Attorney, Agent, or Firm—Bill B. Berryhill

[57] ABSTRACT

A solar energy system comprises first and second generally opposed and at partially spaced-apart panels, one of which is exposed to solar radiation, and both of which are at least partially transparent to solar radiation. The edges of the panels are interconnected so that a chamber is formed between the panels. Radiation absorbing means in the chamber absorbs one portion of the solar radiation transmitted through the exposed panel and converts this portion to sensible heat. The radiation absorbing means transmits another portion of the solar radiation transmitted through the exposed panel in the form of visible light. The radiation absorbing means includes a first fluid circulating in the chamber. A conduit extends through the chamber with a section of the conduit being disposed in the upper portion of the chamber and exposed to the first fluid. A second fluid flowing through the conduit absorbs heat from the first fluid via the conduit and carries this heat away from the chamber where it can be retrieved as potential or kinetic energy.

34 Claims, 14 Drawing Figures fig.2  fig.3 fig.4　　　　fig.5 fig.12 fig.11 fig.13 fig.14

SOLAR ENERGY SYSTEM

BACKGROUND OF THE INVENTION

1. Field of the Invention

The present invention pertains to a system for providing useful energy from the solar radiation reaching the earth's surface. Man's energy demands during the past few hundred years have exceeded those of all the prior years in the life of the earth. This fact points out the staggering rate at which modern technological advances have taken place. These advances have greatly improved the lot of mankind in general. However, they have also cooperated with the ever increasing population of the earth to result in the energy demands mentioned above. Furthermore, continued technological developments and population increases can only be expected to further increase already high energy needs.

Traditionally, the energy to satisfy these needs has been provided by various combustible fuels, most frequently fossil fuels such as petroleum products, natural gas, and coal. However, these fuels are currently being used at a rate which is much greater than that at which they can be replaced by nature, and unless other energy sources are developed, these fuels will eventually be exhausted, albeit in the distant future.

Other problems are attendant upon the use of combustible fuels. One of these is that of pollution in the form of the various products of combustion of the fuels and of those portions of the fuels which are not burned. Another is that the processes for securing these fuels is often disruptive or destructive to the earth's various ecosystems.

One alternative to fuel combustion currently being used and further developed is that of atomic or nuclear energy. However, many experts hope to avoid widespread or increased use of this energy source as it is expensive and considered dangerous in terms of its lethal waste products, which must be isolated from the biosphere for extremely long periods of time, as well as in terms of possible disasters at the nuclear power plants.

Accordingly, much effort has recently been devoted to the development of solar energy systems. Solar radiation is a virtually inexhaustible source of energy, at least in terms of the potential lifespan of the earth. The vast portion of the solar radiation which reaches the earth is presently dissipated as waste heat. Furthermore, solar energy systems, by their very nature, tend to be less dangerous and less ecologically harmful than either nuclear energy systems or the burning of various fuels.

2. Description of the Prior Art

One prior system for using energy is disclosed in prior U.S. Pat. No. 3,832,853 to Butler. In this system, solar radiation striking the sides of an edifice is absorbed by blinds disposed between parallel window panes. The air adjacent the blinds is thus heated and begins to rise in the space between the window panes. From the top of this space, the moving air is directed to a fan which is driven thereby to rotate a shaft by which various other machines may in turn be driven. Since this system uses the air as a motive force, the space between the window panes must be left open so that air can enter, flow through, and leave the space. This leaves the blinds and any other parts which might be disposed in the space susceptible to rust, corrosion, dirt build-up, and various maintenance problems. Furthermore, the system provides no means for varying the disposition of the blinds in the space.

U.S. Pat. No. 2,484,127 to Stelzer discloses a system in which a heating space is formed between a transparent panel exposed to solar radiation and a dark opaque panel opposite the transparent one. Although the energy derived from the heated air is not provided by using the air as a motive force, the air must still flow through the heating space. Furthermore, the presence of the opaque panel precludes the possibility of using the device as or incorporating it in a window.

Another solar energy device is disclosed in U.S. Pat. No. 2,595,905 to Telkes. Here a system of blinds is disposed behind a transparent window or the like. The blinds do not absorb the solar radiation but rather reflect it onto a slab-like container of some heat-absorbing material. Again, visibility through the device is prevented.

U.S. Pat. No. 3,387,602 to Thomason discloses a solar heater comprising one or two panes of glass or the like. An overlayment having a dark surface facing the sun is disposed behind the glass. A fluid spreader is disposed between the dark surface and the glass to evenly distribute water or other liquid which is allowed to trickle down between the dark surface and the glass. Here too, the device must be open so that the water can enter and leave the heating space, and visibility through the device is not permitted.

SUMMARY OF THE INVENTION

The present invention provides a solar energy system in which the solar radiation collecting apparatus transmits a substantial portion of the visible light striking it. Thus, the radiation collecting apparatus can be used as or incorporated in a window for an edifice. The system comprises a first panel, preferably generally vertical, which is exposed to solar radiation and which is at least partially transparent to solar radiation. A second panel, which is also at least partially transparent to solar radiation, is generally opposed to and at lease partially spaced from the first panel. Enclosure means interconnect the edges of the panels so that a chamber is formed therebetween.

The chamber contains radiation absorbing means which absorb a first portion of the solar radiation transmitted through the first panel and convert it to sensible heat. The radiation absorbing means transmits another portion of the solar radiation in the form of visible light. The radiation absorbing means includes a first fluid, preferably a gas, circulating in the chamber. The first fluid is heated by the solar radiation which it absorbs and/or by conduction of heat from one or more radiation absorbing members disposed in the chamber. The first fluid then begins to rise in its circulating space within the chamber.

Heat transfer means is provided to absorb heat from the first fluid at the top of the chamber and carry this heat away from the chamber for use. The first fluid is thereby cooled and can continue circulating in the chamber to absorb further heat. The heat transfer means comprises a conduit extending through the chamber and having a section disposed in the upper portion of the chamber and exposed to the first fluid. A second fluid, preferably a liquid, flows through the conduit absorbing the heat of the first fluid via the conduit.

It can be seen that, because the first fluid never leaves the chamber and the second fluid is encased in its own conduit, the chamber can be completely closed and sealed and the first fluid can be permitted to freely circulate therein. This eliminates many of the maintenance problems inherent in prior art systems in which a fluid had to flow through an open heating space. If the first fluid is suitably chosen, rust and corrosion problems can be greatly reduced. Furthermore, there is no buildup of dust, dirt, etc. on the radiation absorbing members and/or other apparatus which may be located in the chamber.

In one embodiment of the invention, the radiation absorbing means includes a third panel mounted in the chamber in spaced relation to the first and second panels, and preferably also to the top and bottom of the chamber. The third panel is preferably substantially transparent to visible light but absorbing to at least some heat producing radiation outside the visible spectrum.

In another embodiment of the invention, the radiation absorbing means includes a system of generally horizontal louvers. These are spaced from the panels and from each other to allow the first fluid to flow around them and also to allow for vision therebetween. Since the chamber is closed and the louvers are protected, they can be made quite thin thereby decreasing their expense and increasing their efficiency. The louvers, at least on their upper surfaces, are preferably dark to enhance their radiation absorbing characteristics.

In the preferred forms of this last embodiment, means are provided to vary the distance between the louvers in order to take maximum advantage of the angle of incidence of the sun's rays at various times. Means are also provided to vary the angle of the louvers with respect to the panels so as to control the amount of light entering the building. The distance and angle varying mechanisms may be housed in compartments adjacent the chamber. The chamber and compartments, although they may communicate with each other, together form a closed space whereby the parts within are protected from rust, corrosion, dust, etc. as explained above.

The distance and angle varying mechanisms can also be used with systems of louvers other than those which are employed in the solar system.

It is thus a principal object of the present invention to provide an improved solar energy system.

Another object of the invention is to provide a solar energy system in which the solar radiation collecting apparatus can be used as or incorporated in a window for an edifice.

Still another object of the invention is to provide a solar energy system in which a first fluid circulating in a closed space absorbs heat from solar radiation and transfers this heat to a second fluid flowing through a conduit passing through the closed space.

A further object of the invention is to provide a solar energy system including a system of louvers with means to vary the distance between the louvers.

Yet another object of the invention is to provide improved means for varying the angle of louvers in a solar energy system.

Still a further object of the present invention is to provide a solar energy system in which maintenance problems are minimized.

One more object of the present invention is to provide an improved system of louvers.

Other objects, features, and advantages of the present invention will be made apparent by the following description of the preferred embodiments, the drawings, and the claims.

BRIEF DESCRIPTION OF THE DRAWINGS

FIG. 7 is a perspective view of the specialized bearing assembly including the collapse means and associated apparatus;

DESCRIPTION OF THE PREFERRED EMBODIMENTS

Figure 1:
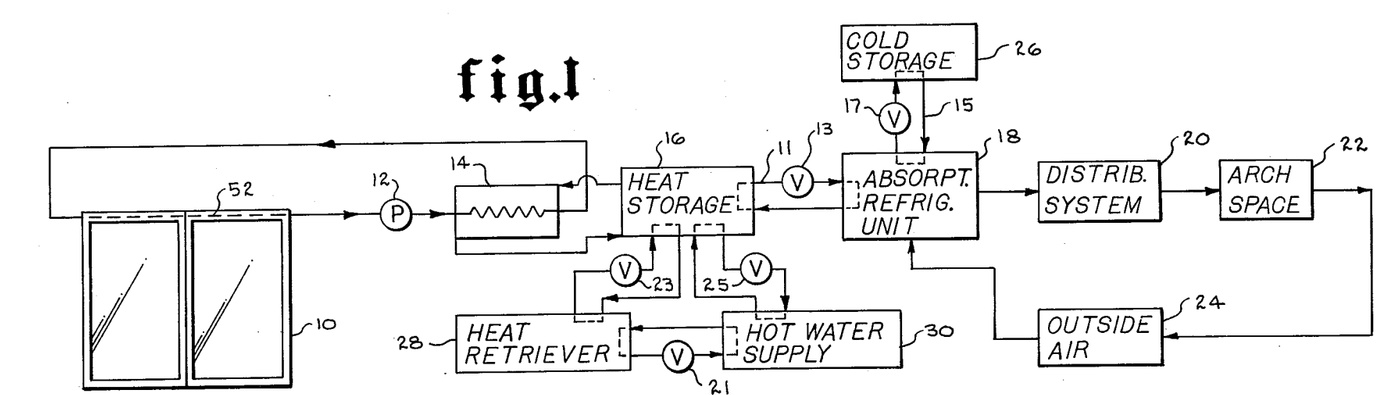
FIG. 1 is a flow diagram generally illustrating a solar energy system according to the invention as incorporated in a building.

Referring now to FIG. 1, there is shown a solar energy system according to the invention comprising a double section window unit 10 of a building which is exposed to solar radiation from the outside of the building. Each section of this window unit 10 comprises inner and outer parallel panels connected at their edges to form a chamber. In some embodiments, the panels might not be strictly parallel. However, they will always be generally opposed, i.e. either parallel or tending to converge at an acute angle. Furthermore, they will always be at least partially spaced apart so that a chamber may be formed therebetween. Incorporated in the chambers of window unit 10 are radiation absorbing means, to be described more fully below, which transmit a portion of this solar radiation to the interior of the building in the form of visible light and which absorb another portion of the solar radiation and convert it to sensible heat. A heat transfer fluid, preferably a liquid, is circulated by a pump 12 in a closed loop which passes through the upper portions of the chambers formed by the window unit 10 and thence through a heat exchanger 14. The radiation absorbing means of window unit 10 includes a fluid, preferably a gas, circulating in the chambers formed by the window unit. This gas is heated by the absorption of radiation and/or by contact with other parts of the radiation absorbing means and rises in the chambers to heat the heat transfer liquid being circulated therethrough by pump 12. This heat is absorbed by another suitable fluid medium in the heat exchanger 14. The heat transfer liquid is thus cooled for recirculation through the chambers of the window unit 10.

The heat absorbed in heat exchanger 14 is in turn transferred to a suitable medium in a heavily insulated heat storage unit 16. The hot medium in unit 16 represents potential energy which can be tapped as needed such as to drive turbo-expanders or other suitable engines and/or to be used in other ways as is well known in the art. For example, it may be used to run an absorption-refrigeration unit 18 which provides both heat and cooling for the building by circulating the hot medium in storage or another fluid heated thereby through a closed loop 11 passing through unit 18 and controlled by a valve 13. Absorption-refrigeration unit 18 communicates directly with the distribution system 20, which comprises ductwork, radiation fins, and/or other means for delivering heat and cooling to architectural space 22 representing the various rooms of the building. Architectural space 22 communicates with the outside air diagrammatically indicated at 24, to allow for exhaust, while fresh air is drawn in to absorption-refrigeration unit 18 for ventilation. Absorption-refrigeration unit 18 also communicates with a cold storage unit 26 via a closed fluid carrying loop 15 controlled by a valve 17. Unit 26 stores a cool medium produced at times which the cooling needs of the building are low and which is selectively used to augment the unit 18 at times when the cooling needs are high.

A heat-retrieving system 28 picks up waste heat from lights, appliances, etc. throughout the building. This heat may be used to provide a supply of hot water 30 for the building by operating a valve 21 which allows fluid heated by the retrieved waste heat to circulate in heat exchange relation with the water supply. If the heat retrieved by the system 28 exceeds what is necessary to provide the hot water supply 30, or if for any reason the heat being supplied to storage unit 16 from window unit 10 and heat exchanger 14 is insufficient, the heat from system 28 may be similarly selectively transferred to the storage unit 16 by operation of valve 23. On the other hand, if the heat from retriever system 28 is insufficient to provide the hot water supply 30, this supply may be selectively heated by hot medium from storage unit 16 by operation of valve 25. FIG. 1 represents only one of many possible systems for using solar energy collected by unit 10. In particular, the system of FIG. 1 is relatively simplified, and, in actual practice, more complex systems involving more component parts and further interconnections between the various parts would probably be used.

Figure 2:
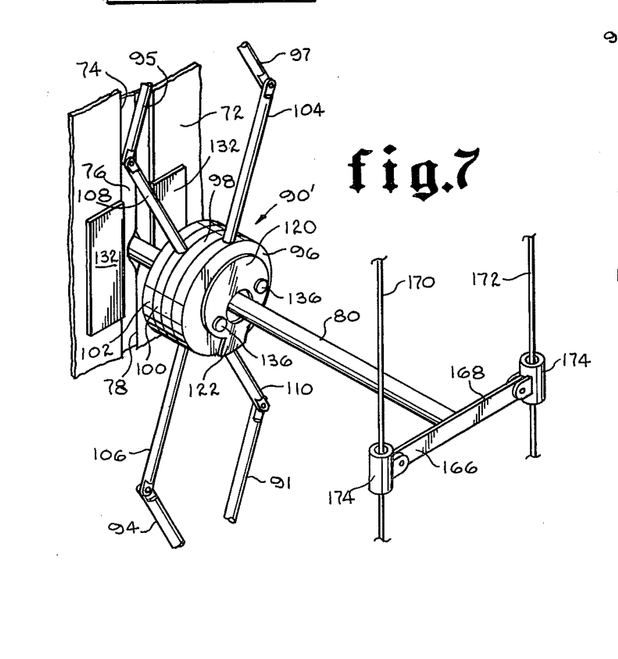
FIG. 2 is an elevational view of a window of a building incorporating various parts of one embodiment of solar energy system according to the invention.
Figures 2, 3:
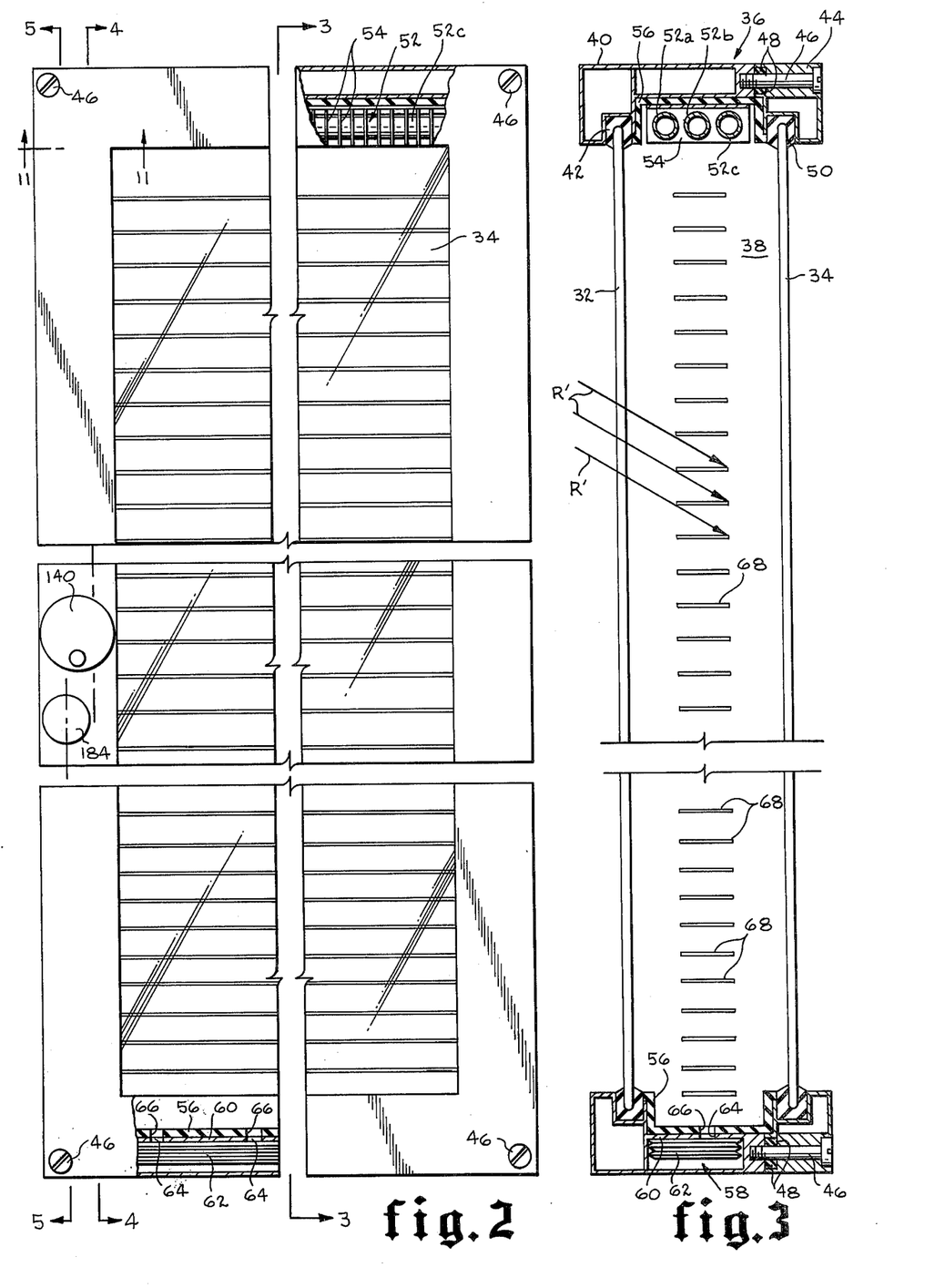
FIG. 3 is a vertical cross-sectional view taken on lines 3—3 of FIG. 2.
Figure 4:
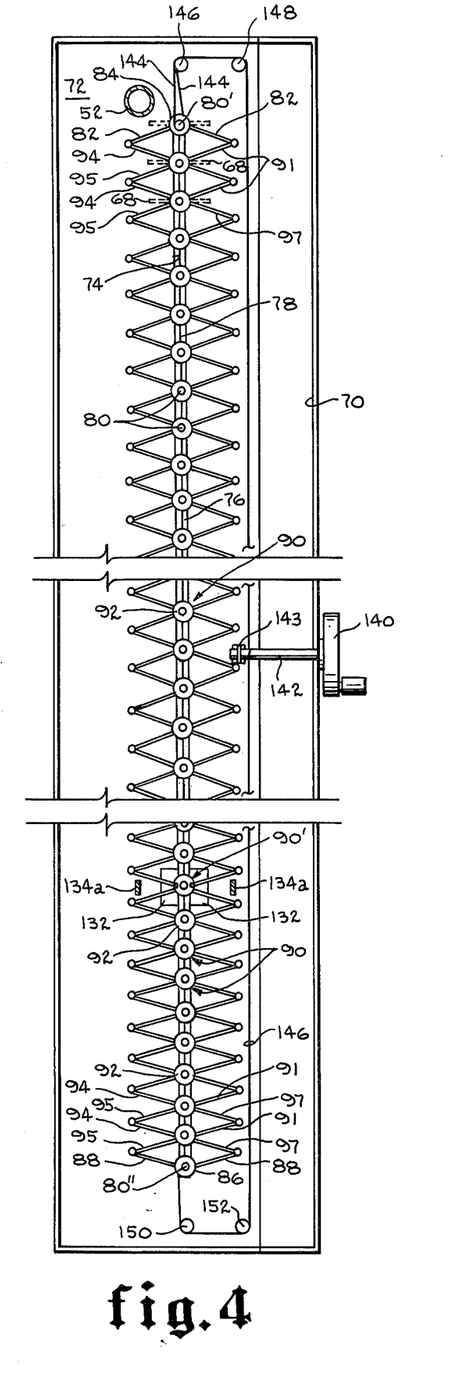
FIG. 4 is a vertical cross-sectional view taken on lines 4—4 of FIG. 2.

Referring now to FIGS. 2 and 3, one section of the window unit 10 is shown in greater detail. The window unit section comprises parallel outer and inner vertical panels 32 and 34 respectively of glass or other suitable material which is at least partially transparent to solar radiation. Panels 32 and 34 are spaced apart and their edges are connected by a window frame assembly 36 so that a closed chamber 38 is formed between them. Window frame assembly 36 comprises an outer portion 40, and the outer panel 32 is mounted in a recess in outer portion 40 by means of a suitable seal 42. Portion 40 further extends inwardly from panel 32 across the major portion of the depth of chamber 38. Window frame assembly 36 also comprises an inner portion 44 which is rigidly affixed to outer portion 40 by screws 46. The inner and outer portions 44 and 40 of the window frame assembly 36 are sealed with respect to each other by gaskets 48. Inner panel 34 is mounted in a recess in inner frame portion 44 by a suitable seal 50.

As mentioned above, each of the panels 32 and 34 is at least partially transparent to solar radiation. Preferably, outer panel 32 is transparent to visible light as well as some non-visible solar radiation, such as in the infrared region of the solar energy spectrum, which reaches it from the outside. Inner panel 34 is preferably transparent to a substantial portion of the solar radiation of wavelengths in the visible spectrum which is transmitted through outer panel 32 but substantially non-transparent to solar radiation of wavelengths outside the visible spectrum. Chamber 38 houses radiation absorbing means which absorb a first portion of the solar radiation, preferably including a major part of the non-visible radiation, transmitted through outer panel 32 and converts this portion to sensible heat. The radiation absorbing means further transmit a second portion of the solar radiation in the form of visible light. Thus, the window unit section, while serving as a window for the occupants of the building, also serves as a solar energy collector.

The radiation absorbing means disposed within the chamber 38 includes a gas freely circulating in the chamber. This gas is heated by absorption of solar radiation transmitted through panel 32 and/or heat conduction through contact with other radiation absorbing members (to be described more fully below). The heated gas rises in the chamber 38 where its heat is absorbed by the heat transfer liquid being circulated by pump 12. The gas in chamber 38 is thereby cooled and flows downwardly in the chamber where it is reheated and again begins to rise.

Figure 11:
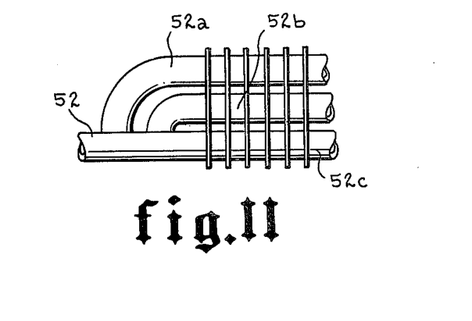
FIG. 11 is a fragmentary view taken on lines 11—11 of FIG. 2.

The heat transfer liquid circulated by pump 12 comprises a part of the heat transfer means of the system by which heat is absorbed from the gas in chamber 38 and transferred to another medium in the heat exchanger 14. The heat transfer means further comprises the conduit or conduit system in which the heat transfer liquid circulates. One section 52 of this conduit or conduit system extends through the upper portion of the chamber 38 and may be sealed with respect to the chamber by suitable gaskets or the like. As shown in FIGS. 3 and 11, section 52 branches into three parallel conduit members 52a, 52b, and 52c in the chamber 38 in order to increase the surface area available for contact with the gas in chamber 38. Each of the conduit members 52a, 52b, and 52c extends through a series of parallel fins 54 of heat conductive material carried by the window frame assembly 36 and extending transverse to the conduit members. The conduit members are thus exposed to the heat from the gas in chamber 38 both directly by contact with that gas and indirectly via the fins 54. The conduit members 52a, 52b, and 52c are also heat conductive so that the transfer liquid is heated via the conduit members as it passes therethrough. The remainder of the conduit system exterior to the chamber 38 may be insulated so that the heat being transferred will not be dissipated. The fins 54 as well as the gas in chamber 38 are insulated from the window frame assembly 36 by insulation 56 which, in the upper portion of the chamber 38, also serves to mount the fins 54 on the window frame assembly.

The lower run of the window frame assembly 36 is hollow and thus defines an expansion compartment 58 adjacent the lowermost part of chamber 38 and separated from chamber 38 by a divider plate 60 disposed immediately beneath insulation 56. A bellows 62 is affixed to the lower surface of plate 60 within the compartment 58. Bellows 62 communicates with a plurality of aligned apertures 64, 66, in plate 60 and insulation 56 respectively and thereby with the chamber 38. Thus, when the gas in chamber 38 is heated, it is allowed to expand into the bellows 62 in compartment 58 so that dangerously high pressures will not prevail in the chamber 38. However, bellows 62 will force the gas back into the chamber 38 when the pressure decreases so that as much of the gas as possible, within the limits of safety, will always remain in chamber 38.

The gas in chamber 38 may be comprised primarily of air which is preferably treated to reduce the tendency toward oxidation, corrosion or other damage to the window frame assembly, any heat absorbing members which might be disposed in the chamber, and any control apparatus (described below) which may be disposed in chamber or in adjacent compartments. In particular, the air which is disposed in chamber 38 may be dehumidified in any well known manner. A small amount of ozone may also be added to the air to enhance the heat absorbing characteristics of the gas mixture by allowing it to directly absorb solar radiation and convert it to sensible heat. However, a mixture of dehumidified air and ozone represents only one example of the fluid of the heat absorbing means of the invention and many other gases might be used. In some instances it might even be possible to use a liquid as the fluid. In general, where the heat absorbing means of the system consists only of the fluid, it will be important to choose a fluid which can directly absorb solar radiation and convert it to sensible heat. In systems in which the heat absorbing means also includes heat absorbing members such as louvers, the absorption of solar radiation directly by the fluid is less critical as long as the fluid is capable of being heated by conduction via contact with the heat absorbing members.

The heat transfer fluid circulated by pump 12 is preferably a liquid of such nature that it will not tend to damage the conduits through which it flows. It is also desirable that the heat transfer liquid have a relatively high boiling point with respect to the temperatures to which it will be subjected in use so that it can be maintained in liquid form in the system without the need for maintaining a high pressure in the conduits through which it flows. Numerous suitable liquids, such as those which have been used for other heat exchange processes, will suggest themselves to those skilled in the art.

Referring again to FIGS. 2 and 3, the heat absorbing means in chamber 38 include a number of parallel blinds or louvers 68 extending horizontally across the chamber. Solar radiation transmitted by the outer panel 32 strikes the outer surfaces of the louvers 68 as indicated by the rays R'. A portion of this radiation is absorbed by the louvers and converted to sensible heat. This heat is picked up by the surrounding gas in chamber 38 thereby augmenting the direct heating of the gas by the solar radiation. The louvers 68, or at least their upper surfaces, are preferably black to enhance their radiation absorbing characteristics. Furthermore, since the louvers 68 are protected against physical damage by their disposition in closed chamber 38, they may be made thinner and lighter than ordinary blinds, which is an economic advantage.

Another portion of the solar radiation transmitted through panel 32 passes between the louvers 68 and strikes the inner panel 34. This includes radiation which is reflected from the louvers as well as any radiation which might not strike the louvers. A significant part of this radiation transmitted past the louvers 68 is in the visible spectrum and is thus transmitted by panel 34 into the adjacent room of the building. As mentioned above, panel 34 is preferably non-transparent to any solar radiation outside the visible spectrum which is transmitted past panel 32 and chamber 38. If panel 34 reflects such non-visible radiation, a substantial portion of it will again strike the louvers 68 so that even more heat may be produced. If, on the other hand, the panel 34 absorbs the non-visible radiation, it is preferably insulated so that any heat thus produced will not be conducted into the adjacent room but rather will further heat the gas in chamber 38. Panel 32 is also preferably insulated so that the heat in the chamber 38 will not be dissipated to the outside air.

Rays R' in FIG. 3 represent a typical angle of incidence of the sun's rays during the winter months in the northern hemisphere. FIG. 3 shows that the spacing between the louvers 68 takes best advantage of the angle of rays R' by providing the maximum number of louvers while still permitted radiation to reach the innermost edges of the louvers. As is well known, the angle of incidence of the sun's rays changes seasonally as well as during the course of the day. Accordingly, means are provided in the present invention to vary the spacing between the louvers so as to take best advantage of the angle of incidence of the sun's rays at any given time. However, it is also intended that these means may be used to vary the spacing of any set of blinds or louvers for whatever reason the user may have.

The distance varying means are shown in detail in FIGS. 4 and 6–12. A control compartment 70 is formed within the window frame assembly 36 adjacent the left side of the chamber 38. A similar compartment (not shown) is formed adjacent the right side of chamber 38. The walls defining compartment 70 are part of the window frame assembly 36 and include a partition wall 72 separating chamber 38 from compartment 70 and having an elongate vertical slot 74 therethrough. A similar slot is formed in the adjacent portion of insulation 56. Wall 72 may be formed in two abutting parts corresponding to the inner and outer parts 44 and 40 of the window frame assembly 36. A strip of elastomeric sealing material 76 is mounted in the slot 74 and has a vertical slit 78 therethrough. Each of the louvers, with the possible exception of the uppermost and lowermost ones, has a shaft 80 rigidly carried by its left end and extending through slit 78 and into compartment 70. The slit 78 allows rotation and vertical movement of the shafts extending therethrough while the elastomeric strip 76 conforms substantially to the surfaces of these shafts so that the gas in chamber 38 is prevented from leaking into the compartment 70. The compartment on the right of chamber 38 is also divided from chamber 38 by a wall similar to 72 and having an identical slot and strip of sealing material. The louvers 68 have shafts similar to 80 on their right ends which extend into the adjacent compartment.

An upper pivot shaft 80' is mounted in the wall 72 above the slot 74 so that it can rotate (for the purpose of louver angle variation to be described more fully below) but remains in a fixed location; in particular, shaft 80' cannot move vertically. As shown, the pivot shaft 80' is affixed to the top louver. However, it could be mounted on wall 72 above the top louver. A lower pivot shaft 80" is free to move vertically as are the shafts 80. As shown, lower pivot shaft 80" is affixed to the bottom louver although it could be located below it.

Upper pivot shaft 80' carries a bearing assembly comprising two concentric rings one of which is shown at 84. The rings 84 are independently rotatably mounted on shaft 80' by needle bearings and lubricated by a suitable material such as graphite. Each of the rings 84 has a respective upper link arm 82 rigidly carried thereby and extending radially outwardly. Lower pivot shaft 80" carries a similar bearing assembly comprising independently rotatable rings 86 each having a respective lower link arm 88 rigidly carried thereby and extending radially therefrom.

Each of the shafts 80 of each of the louvers intermediate the upper and lower pivot shafts 80' and 80" also carries a bearing assembly and serves as a control shaft. With the exception of one specialized bearing assembly 90', to be described more fully below, each of these intermediate bearing assemblies 90 comprises two coaxial rings 92 and 93 independently rotatably mounted on their respective shaft 80 and similar to the rings 84 and 86 except that each of the rings 92 and 93 rigidly mounts not one but a diametrically opposed pair of radially extending louver link arms. Thus, each such pair of diametrically opposed louver link arms rotates jointly with its respective ring 92 or 93. In particular, each ring 92 has one arm 91 extending generally upwardly and to the right and another arm 95 extending generally downwardly and to the left as the apparatus is viewed in FIGS. 4, 6, and 12. Each of the rings 93 has one arm 94 extending generally upwardly and to the left and another arm 97 extending generally downwardly and to the right. Thus, the arms 91, 95, 94 and 97 of each bearing assembly 90 form a generally X-shaped structure.

As best seen in FIGS. 7–10, the specialized bearing assembly 90' includes four coaxial rings 96, 98, 100, and 102 rotatably mounted on the respective shaft 80 by needle bearings 95. Each of the rings 96, 98, 100, and 102 rigidly mounts a respective radially extending link arm 104, 106, 108, or 110. The outer face of each of rings 96 and 102 is recessed to receive a respective retainer ring 103 which fits in a respective annular groove in shaft 80. Rings 103 retain the entire assembly 90' in place on shaft 80. Each of the rings 96, 98, 100, and 102 has a respective aperture 112, 114, 116, or 118 therethrough parallel to but spaced from the shaft 80. The apertures 112 and 114 of adjacent rings 96 and 98 are disposed such that when these apertures are aligned with each other, the respective arms 104 and 106 will be diametrically opposed. Similarly, when the apertures 116 and 118 of adjacent rings 100 and 102 are aligned, respective arms 108 and 110 will be diametrically opposed.

Figure 9:
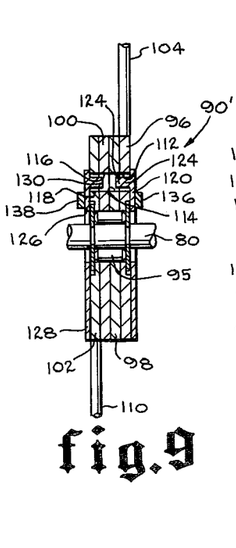
FIG. 9 is a cross-sectional view taken on lines 3—3 of FIG. 8 and showing the collapse means before release.
Figure 10:
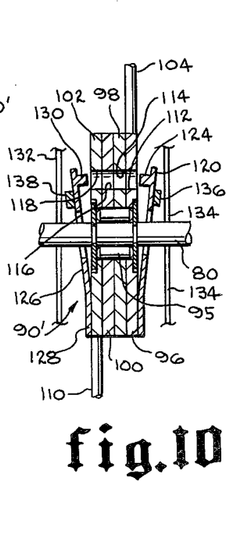
FIG. 10 is a view similar to that of FIG. 9 showing the collapse means after release.

A spring flap is disposed adjacent the outer side of ring 96. This flap has a generally circular portion 120 having a central opening for receipt of shaft 80 and a tab portion 122 extending radially from circular portion 120 and affixed to the outer side of ring 96. A stud 124 extends from the inner side of circular portion 120 and is sized and spaced so as to be receivable in apertures 112 and 114 when the latter are aligned as shown in FIG. 9. The spring nature of flap 120, 122 biases the circular portion 120 inwardly to retain stud 124 in apertures 112 and 114 as a fixing means unless released (by means to be described below) so that rings 96 and 98 and their diametrically opposed arms 104 and 106 will rotate as a unit. An identical spring flap having circular portion 126, receiving shaft 80, and tab portion 128 affixed to the outer side of ring 102 is disposed at the other end of bearing assembly 90'. Circular portion 126 is also biased inwardly and carries a stud 130 on its inner side which may be received in the apertures 116 and 118, when the latter are aligned, so that the rings 100 and 102 and arms 108, 110 will rotate as a unit. Thus, when the studs 124 and 130 are in the positions shown in FIG. 9, assembly 90' will operate as one of the two-ring assemblies 90. In particular, rings 96 and 98 will act as a single ring corresponding to rings 92 of the other bearings assemblies, when arm 104 corresponding to arms 91 and arm 106 corresponding to arms 95. Rings 100 and 102 will also act as a single ring corresponding to rings 93 with arm 108 corresponding to arms 94 and arm 110 corresponding to arms 97.

The upper link arms 82 extend generally downwardly and are pivotally connected to respective ones of the upwardly extending arms 91 and 94 of the next adjacent louver 68. The lower link arms 88 extend generally upwardly and are pivotally connected to respective ones of the downwardly extending arms 95 and 97 of the next adjacent louver 68. The rest of the louvers 68 each have their upwardly extending arms 91 and 94, or 104 and 108, pivotally connected to the downwardly extending arms 97 and 95, or 106 and 110, respectively of the next higher louver and vice versa so that a parallelogram linkage is formed between the left hand ends of each adjacent pair of louvers 68. Similar linkages are provided at the right hand ends of the louvers 68. A specialized bearing assembly such as 90' is carried by the same louver at its right hand end.

Figure 12:
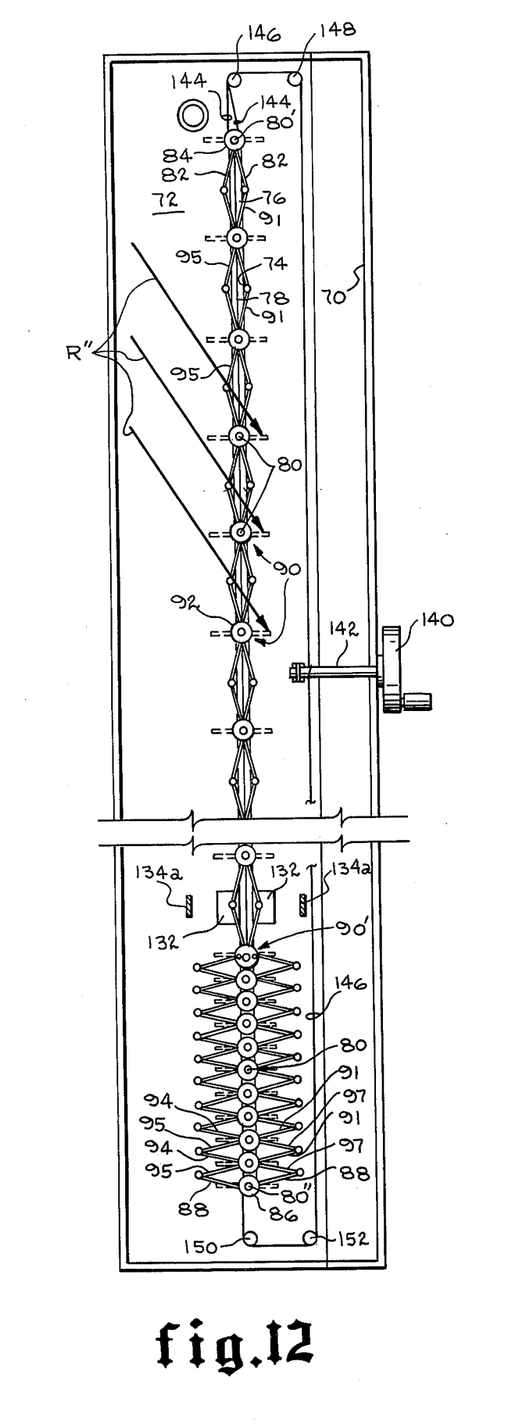
FIG. 12 is a view similar to that of FIG. 4 showing the apparatus in summer mode.

It can thus be seen that if one of the louvers 68 is raised, all of the louvers, with the exception of the one attached to shaft 80', will also rise, while the parallelogram linkages will maintain equal spacing between the louvers and cause them to move closer and closer together. Similarly, if one of the louvers 68 is lowered, all of the louvers except the one attached to shaft 80' will move downwardly and the distance between them will increase uniformly provided the lower pivot shaft 80" is free to move down. However, it can also be seen that, when the louvers 68 are in the positions shown in FIGS. 2–4. Shaft 80" is not free to move down any further but rather is in abutment with the bottom of the slot 74 in wall 72. Accordingly, means must be provided to allow the lower parallelogram linkages to collapse horizontally, as shown in FIG. 12, so that the upper parallelogram linkages can elongate vertically so as to further space their respective louvers 68.

Accordingly, a pair of ferrous metal plates 132 are mounted in the wall 72 on opposite sides of the slot 174. A second pair of metal plates 134 are disposed parallel to respective ones of the plates 132 and are spaced from the plates 132 by a distance sufficient to allow the bearing assemblies 90 and 90' to pass between the two pairs of plates. Each of the plates 34 has an integral L-shaped arm 134a which extends laterally ouwardly from its respective plate and then toward the wall 172 on which it is mounted so as to hold plates 134 in spaced relation to plates 132. Plates 134 are also spaced from each other by a distance sufficient to allow the shafts 80 and 80" to pass therebetween.

Plates 132 and 134 are spaced from the bottom of slot 74 by a predetermined distance prescribed by the number of lower parallelogram linkages which must be allowed to collapse horizontally to allow the desired vertical elongation of the upper parallelogram linkages.

The specialized bearings assembly 90' is then carried by that louver 68 which will be adjacent the plates 132 and 134 when the lower pivot shaft 80" has reached the bottom of the slot 74.

Figure 6:
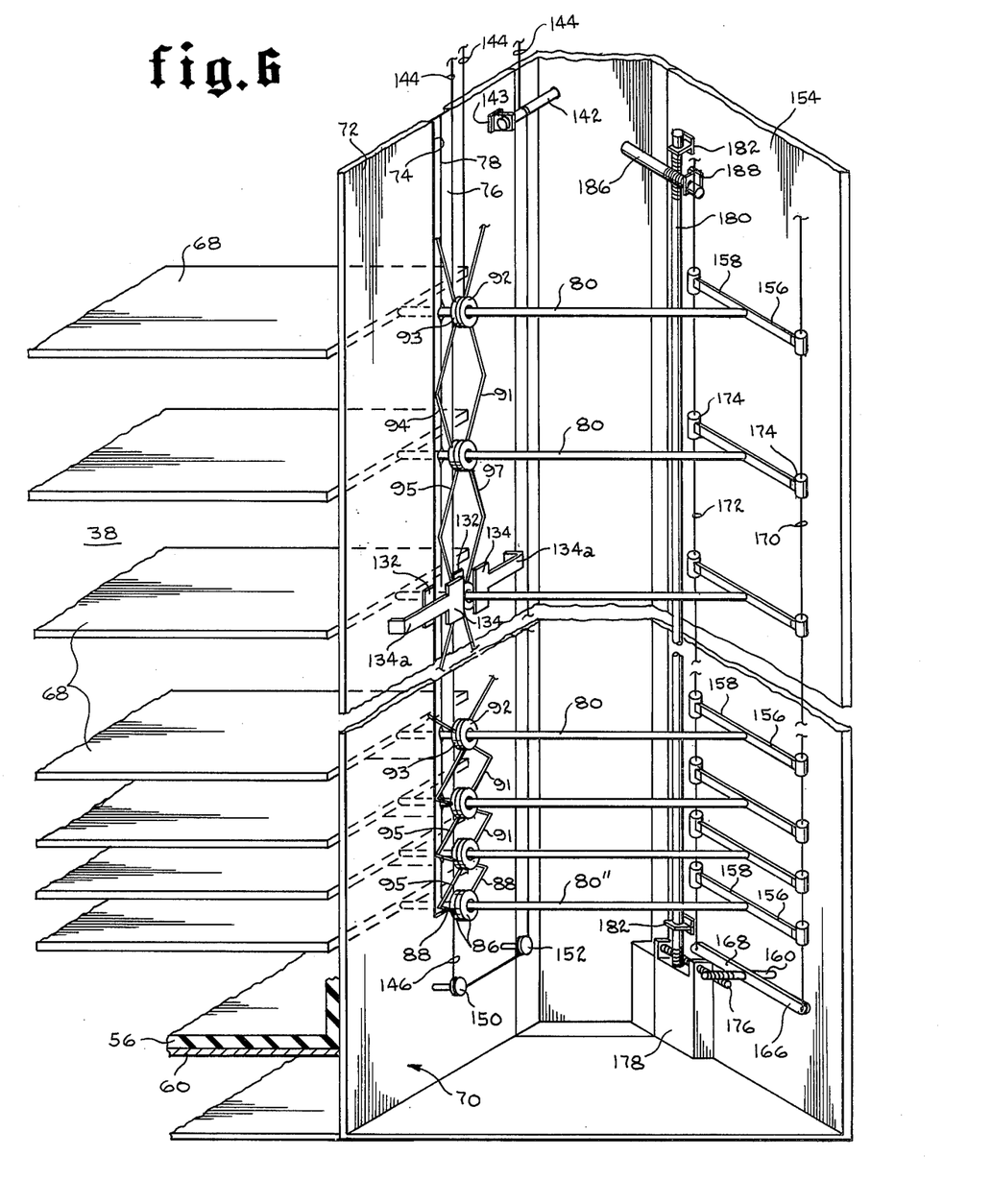
FIG. 6 is an enlarged perspective view of part of the apparatus generally shown in FIGS. 4 and 5.
Figure 8:
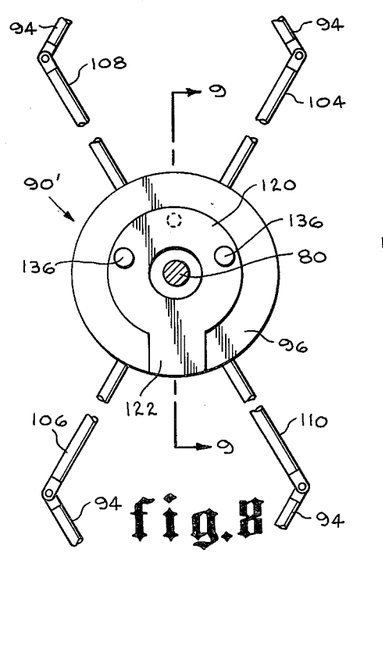
FIG. 8 is an elevational view of the specialized bearing assembly of FIG. 7.

Circular portion 120 of the spring flap mounted on ring 96 has a pair of magnets 136 mounted on its outer side on opposite sides of the shaft 80. With the specialized bearing assembly 90' in the position shown in FIG. 4, magnets 136 will be attracted to respective ones of the plates 134 so that circular portion 120 will be drawn outwardly against its spring bias to the position shown in FIG. 10. This withdraws stud 124 from apertures 112 and 114. Similar magnets 138 are mounted on the outer side of circular portion 126 of the other spring flap and are attracted to plates 132 so that stud 130 is withdrawn from apertures 116 and 118. Rings 96, 98, 100 and 102 can now rotate independently so that, upon further downward movement of the shaft 80 which carries the specialized bearing assembly 90', all of the parallelogram linkages below assembly 90' will be allowed to collapse horizontally, and all of the parallelogram linkages above assembly 90' can continue to lengthen vertically. FIG. 6 shows the parallelogram linkages just after the specialized bearing assembly 90' has passed the plates 132 and 134 with the lower linkages partially collapsed. FIG. 12 shows the lower linkages completely collapsed and the upper linkages elongated sufficiently to adapt the corresponding louvers 68 to the maximum angle of incidence of sun's rays for which the system is designed, indicated by the rays R". The bearing assemblies 90 and 90' have been shown relatively large for purposes of illustration. However, in actual practice, they could be refined and reduced so that even more complete collapse of the lower linkages might be achieved if desired.

If the louvers are raised, the arms 104, 106, 108, and 110 will be arranged in diametrically opposed pairs at the point where the specialized bearing assembly 90' begins to pass upwardly beyond the plates 132 and 134. Thus, at this point the spring flaps 120, 122 and 126, 128 now freed from the influence of the magnetic force will return the studs 124 and 130 to the positions of FIG. 9 so that the specialized bearing assembly 90' again becomes effectively the same as one of the other assemblies 90, i.e. the arms of each of its pairs 104, 106 and 108, 110 will remain diametrically opposed and will rotate as a unit.

The distance varying mechanism described thus far is, as noted, disposed in control compartment 70 and is duplicated by identical apparatus in a similar compartment on the other side of the chamber 38. Attention is now directed to the control means for raising and lowering the louvers to effect this distance variation. The control means is disposed in compartment 70 and, due to the systems of parallelogram linkages, need not be duplicated in the other compartment. The control means for the distance varying apparatus comprises a knob 140 carried by a shaft 142 which is rotatably mounted in the inner portion 44 of the window frame assembly 36 in any suitable manner and extends into the control compartment 70. The inner end of shaft 142 is retained by brackets 143 on wall 72. The control means further comprises a pair of generally parallel flexible lines 144 which are attached to any one of the shafts 80 above that which carries the specialized bearing assembly 90'. Lines 144 extend upwardly from the shaft 80 to which they are attached on opposite sides of the shafts 80 and 80'. Above shaft 80', lines 144 meet and effectively become one line which passes over a pair of sheaves 146 and 148 mounted on wall 172 and thence downwardly to shaft 142 to which they are attached. A second flexible line 146, which may be a continuation of one of the lines 144, is attached to same shaft 80 to which lines 144 are attached and extends downwardly therefrom along one side of the shafts 80 and 80" therebelow. Line 46 then passes under a pair of sheaves 150 and 152 mounted on the wall 172 and thence upwardly to the shaft 142 to which it is attached.

It can thus be seen that when shaft 142 is rotated by knob 140 in one direction lines 144 will be wound onto shaft 142 and line 146 will be played out. The shaft 80 to which the lines 144 and 146 are attached will then be raised and, because of the parallelogram linkages, all of the other shafts 80 as well as shaft 80" will also rise. Rotation of shaft 142 in the opposite direction will play out lines 144 and wind line 146 to similarly lower the shafts 80 and 80". While raising and lowering of the louvers 68 could be accomplished by use of only one of the lines 144, the provision of the second line 144 and of the line 146 is preferable since it prevents undesired canting of the louvers.

Figure 5:
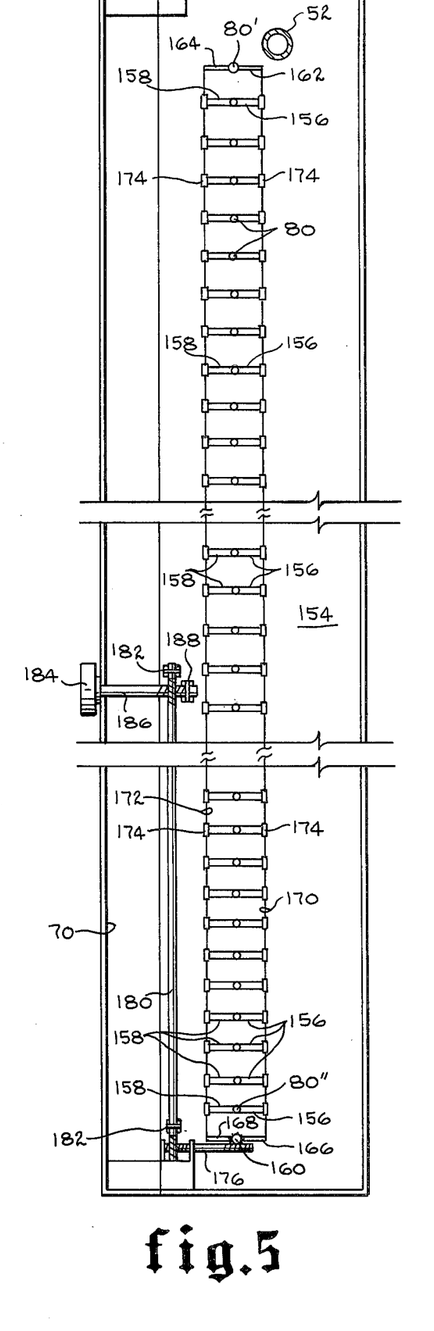
FIG. 5 is a vertical cross-sectional view taken on lines 5—5 of FIG. 2.

Referring now to FIGS. 5-7, there is shown apparatus for uniformly varying the angle of the louvers 68 with respect to the panels 32 and 34 as, for example, to decrease the amount of visible light permitted to enter the adjacent room. The angle varying apparatus is disposed in control compartment 70 and need not be duplicated in the corresponding compartment on the other side of the chamber 38. As best seen in FIGS. 6 and 7, each of the shafts 80', 80, and 80" extends outwardly beyond its respective bearing assembly toward control compartment wall 154 opposite wall 72. The outer end of each shaft 80 and 80" rigidly carries first and second louver tilting arms 156 and 158 extending radially from the respective shaft 80 or 80" and lying generally horizontally. The arms 156 and 158 of each shaft 80 or 80" may actually comprise the opposite ends of an integral bar. First louver tilting arms 156 are all parallel and aligned, as are second louver tilting arms 158.

The upper shaft 80' is vertically and laterally fixed with respect to wall 72 and rotatably mounted therein and thus may serve as the upper pivot shaft for the angle varying means. Upper shaft 80' may or may not have a louver 68 affixed thereto. Shaft 80", which serves as the lower pivot shaft for the distance varying means, is vertically movable as explained above. Accordingly, it is preferable to provide another lower pivot shaft 160 below shaft 80" for the angle varying means. Shaft 160 is mounted in wall 154 parallel to shafts 80', 80, and 80" in any suitable manner for rotation but not for vertical or lateral movement.

First and second pivot shaft tilting arms 162 and 164 are rigidly carried by the outer end of upper pivot shaft 80' parallel to arms 156 and arms 158 respectively. Similarly, first and second pivot shaft tilting arms 166 and 168 are rigidly carried by lower pivot shaft 160 parallel to arms 156 and 158 respectively. A vertical line 170 has its ends secured to the ends of respective ones of the first pivot shaft tilting arms 162 and 166 and is drawn taut therebetween. A similar line 172 has its ends secured to the ends of respective ones of the second pivot shaft tilting arms 164 and 168 and is also drawn taut. The lines 170, 172 are flexible so that they can pivot with respect to the attached arms 162, 166 and 164, 168. Each of the louver tilting arms 156 and 158 has a small cylinder-type eyelet 174 pivotally mounted on its outer end for movement about an axis parallel to the shafts 80. Line 172 passes slidably through the eyelets 174 on the first louver tilting arms 156, and line 172 passes slidably through the eyelets 174 on the second louver tilting arms 158.

It can thus be seen that if either of the pivot shafts 80' or 160 are rotated, the arms 162, 164, 166 and 168 will tilt. This will cause a corresponding tilting of each of the arms 156 and 158 so that each of the shafts 80', 80, 80'' and 160 will rotate by the same amount. Accordingly, each of the louvers 68 will be tilted while the louvers will still remain parallel.

All of this is accomplished by rotation of lower pivot shaft 160. Accordingly, the inner end of shaft 160 is provided with a suitable gear interengaging a mating gear on a transverse horizontal shaft 176. Shaft 176 is mounted for rotation but not longitudinal or transverse movement by a bracket 178 affixed to the floor of compartment 70. Gearing on shaft 178 interengages similar gearing on the lower end of a vertical shaft 180 mounted on wall 154 by brackets 182 and abutting block 178. Brackets 182 and block 178 allow shaft 180 to rotate but not to move laterally or longitudinally. A control knob 184 is rigidly carried by a shaft 186 rotatably mounted in the inner portion 44 of window frame assembly 36. The inner end of shaft 186 is retained by brackets 188 on wall 154. The mounting of shaft 186 allows rotation but not longitudinal or lateral movement. The inner end of shaft 186 and the upper end of shaft 180 have interengaging gears. Thus, when knob 184 is rotated, the rotary motion is transmitted via shafts 186, 180 and 176 to lower pivot shaft 160 so that the louvers 68 are tilted as explained above.

Figure 13:
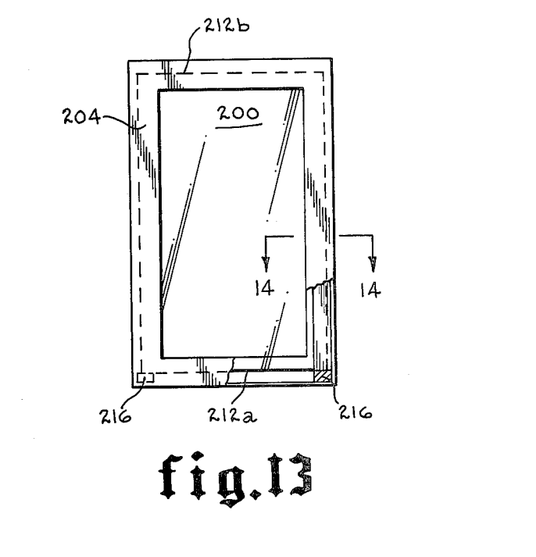
FIG. 13 is an elevational view, with parts broken away, of a window of a building incorporating various parts of a second embodiment of solar energy system according to the invention.
Figure 14:
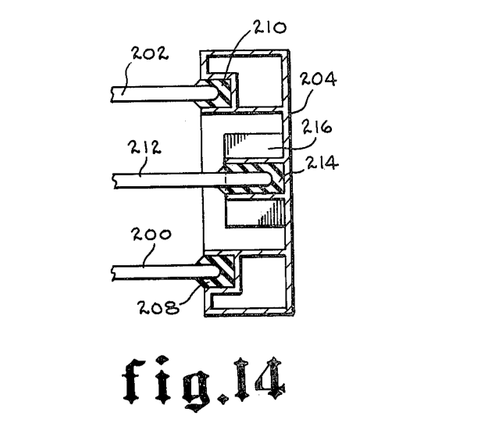
FIG. 14 is an enlarged partial cross-sectional view taken on lines 14—14 of FIG. 13.

Referring now to FIGS. 13 and 14, there is shown another embodiment of the invention. In particular, FIGS. 13 and 14 illustrate the window portion of the other embodiment, the other parts of the system being substantially identical. The window section shown in FIGS. 13 and 14 comprises an outer panel 200 having substantially the same characteristics as outer panel 32 of the first embodiment. The inner panel 202 is parallel to and spaced from panel 200 and has substantially the same characteristics as inner panel 34 of the first embodiment. A window frame assembly 204 interconnects the edges of panels 200 and 202 so that a chamber is formed therebetween. Window frame assembly 204 may be comprised of two or more portions to allow assembly and disassembly. The edges of panels 200 and 202 are mounted in suitable grooves or channels in the window frame assembly 204 by respective seals 208 and 210.

The heat absorbing means of the embodiment of FIGS. 13 and 14 includes a gas similar to that of the first embodiment freely circulating in the chamber formed between panels 200 and 202 as well as a third panel of partially transparent material 212 which is mounted in the window frame assembly parallel to and spaced from each of the other two panels 200 and 202. The side edges of panel 212 are mounted in grooves or channels in the side runs of the window frame assembly by seals, one of which is shown at 214. The lower edge 212a of panel 212 is spaced from the bottom of the chamber by horizontally spaced apart blocks 216 on which it rests. Seals 214 also extend between blocks 216 and edge 212a as indicated at 214a to cushion the glass. Panel 212 is sized so that its upper edge 212b is also spaced from the top of the chamber. Thus, the gas in the chamber can circulate around the panel 212.

The material of which panel 212 is formed is preferably transparent to visible light but absorptive to at least some non-visible solar radiation such as in the infrared region of the solar energy spectrum. Thus, panel 212 will convert the radiation it absorbs to sensible heat, which will be transmitted to the surrounding gas, but will not interfere with the window function. The embodiment of FIGS. 13 and 14 can be designed to include other features shown in the embodiment of FIGS. 1-12 such as an expansion compartment.

It can be seen that both of the above embodiments of the present invention provide improved solar energy collecting apparatus which can be used as a window for a building. Furthermore, the window is aesthetically pleasing and does not differ drastically in appearance from ordinary windows with blinds. The radiation absorbing means is located in a closed chamber, and any control apparatus needed may be located in compartments adjacent that chamber and hidden from view by the window frame assembly. The compartments and chamber together form a closed space whereby the enclosed apparatus is protected against contamination, physical abuse, rust corrosion, etc.

It can also be appreciated that numerous modifications of the preferred embodiments may be made without departing from the spirit of the invention. For example, the solar radiation collecting apparatus may be incorporated in a skylight or roof structure rather than in a vertical window unit. It is thus intended that the scope of the invention be limited only by the claims which follow.

I claim:

1. A solar energy system comprising:
    a first panel exposed to solar radiation and at least partially transparent to said solar radiation;
    a second panel generally opposed to and at least partially spaced from said first panel and at least partially transparent to solar radiation transmitted through said first panel;
    enclosure means interconnecting the edges of said panels whereby a chamber is formed between said panels;
    radiation absorbing means in said chamber operative to absorb a first portion of the solar radiation transmitted through said first panel and convert said first portion to sensible heat, and further operative to transmit a second portion of the solar radiation transmitted through said first panel in the form of visible light, said radiation absorbing means comprising a first fluid circulating in said chamber;
    heat transfer means comprising a conduit extending through said chamber, said conduit including a section disposed in the upper portion of said chamber, said section being exposed to the heat of said first fluid, and a second fluid flowing through said conduit and operative to absorb heat from said first fluid via said section of said conduit and carry said heat away from said chamber.

2. The solar energy system of claim 1 further comprising heat extracting means disposed externally of said chamber, said conduit being connected to said heat extracting means, and said heat extracting means being operative to extract heat from said second fluid and utilize said heat to provide energy.

3. The solar energy system of claim 2 wherein said heat extracting means comprises a heat exchanger, said system further comprising heat storing means, said heat exchanger being operative to transfer said heat to said heat storing means, whereby said heat is substantially retained as potential energy.

4. The solar energy system of claim 1 wherein said panels are generally parallel and generally vertically disposed.

5. The solar energy system of claim 4 wherein said panels are mounted in a wall of an edifice to form a window of said edifice.

6. The solar energy system of claim 5 wherein said first portion of said solar radiation absorbed by said radiation absorbing means includes non-visible radiation.

7. The solar energy system of claim 6 wherein said control panel is transparent to a major portion of the visible light transmitted through said first panel and said radiation absorbing means.

8. The solar energy system of claim 7 wherein said second panel is at least partially non-transparent to non-visible radiation.

9. The solar energy system of claim 7 wherein said second panel has heat insulating characteristics.

10. The solar energy system of claim 9 wherein said first panel has heat insulating characteristics.

11. The energy system of claim 4 wherein said first fluid is a gas freely circulating in said chamber.

12. The solar energy system of claim 1 wherein said second fluid is a liquid.

13. The energy system of claim 12 wherein said heat transfer means further comprises heat conductive means within said chamber in contact with said section of said conduit.

14. The energy system of claim 13 wherein said heat conductive means comprises a plurality of fin members extending downwardly into said chamber and disposed generally transverse to said conduit, said conduit extending through said fins.

15. The energy system of claim 11 wherein said enclosure means comprises means defining an expansion compartment adjacent to and communicating with said chamber and resilient means in said compartment yieldable in response to increasing pressure in said chamber to allow said first fluid to expand into said compartment and returnable in response to decreasing pressure in said chamber to expel said first fluid from said compartment into said chamber.

16. The solar energy system of claim 11 wherein said radiation absorbing means further comprises at least one radiation absorbing member mounted in said chamber in contact with said first fluid for absorbing solar radiation transmitted by said first panel and heating said first fluid.

17. The solar energy system of claim 16 wherein said radiation absorbing member comprises a third panel generally parallel to and spaced from said first and second panels, said third panel being transparent to visible light and absorptive to non-visible radiation.

18. The solar energy system of claim 17 wherein said third panel is spaced from said enclosure means at its upper and lower edges.

19. The solar energy system of claim 16 wherein said radiation absorbing means comprises a plurality of said radiation absorbing members spaced from said panels and from each other whereby said first fluid may circulate about said radiation absorbing members.

20. The solar energy system of claim 19 wherein said radiation absorbing members comprise a plurality of generally parallel louvers extending generally horizontally in said chamber.

21. The solar energy system of claim 20 further comprising means for varying the distance between said louvers.

22. The solar energy system of claim 21 wherein said louvers have respective control shafts rigidly carried by and extending longitudinally from respective aligned ends of said louvers, said distance varying means being operatively associated with said control shafts.

23. The solar energy system of claim 22 wherein said distance varying means comprises:
an upper pivot shaft in fixed location with respect to said chamber and disposed generally parallel to said control shafts and above said louvers;
a pair of upper link arms extending radially from and independently rotatably mounted on said upper pivot shaft;
a lower pivot shaft generally vertically movable with respect to said chamber and disposed generally parallel to said control shafts and below said louvers;
a pair of lower link arms extending radially from and independently rotatably mounted on said lower pivot shaft;
two pair of louver link arms extending radially from each of said control shafts, the louver link arms of each pair being diametrically opposed and being mounted for joint rotation about said control shaft independently of said other pair of louver link arms;
each of said link arms of each of said shafts being pivotally connected to a respective link arm of an adjacent one of said shafts for movement about an axis generally parallel to said shafts whereby parallelogram linkages are formed between said shafts; and
means connected to a first one of said louvers for selectively raising and lowering said first louver.

24. The solar energy system of claim 23 further comprising collapse means operative upon lowering of said first louver to a predetermined point to cause collapse of a given number of said parallelogram linkages.

25. The solar energy system of claim 24 wherein there is a second louver disposed between said first louver and said lower pivot shaft;
wherein said collapse means comprises releasable fixing means carried by said second louver securing the louver link arms of each of the pairs of louver link arms of said second louver to each other for joint rotation, and release means fixedly mounted adjacent the path of said fixing means for releasing said fixing means to allow independent rotation of said louver link arms of said second intermediate louver and thereby allow collapse of the parallelogram linkages below said second louver.

26. The solar energy system of claim 25 wherein said collapse means further comprises magnetic means cooperative between said release means and said fixing means to cause release of said fixing means upon lowering of said fixing means past said release means, and wherein said fixing means are resiliently biased to return to an engaged fixing position upon raising of said fixing means past said release means.

27. The solar energy system of claim 22 further comprising means defining a control compartment adjacent one side of said chamber, said control shafts extending into said control compartment and said distance varying means being disposed in said control compartment.

28. The solar energy system of claim 27 further comprising a partition wall between said control compartment and said chamber, said partition wall having a generally vertical slot therethrough, deformable seal means mounted in and substantially filling said slot, said seal means having a substantially vertical slit therethrough, said control shafts extending through said slit and said seal means sealing around said control shafts while still allowing generally vertical movement of said shafts.

29. The solar energy system of claim 28 further comprising means for varying the angle of said louvers with respect to said panels, said angle varying means being disposed in said control compartment and operatively associated with said control shafts.

30. The solar energy system of claim 20 further comprising means for varying the angle of said louvers with respect to said panels.

31. The solar energy system of claim 30 wherein said louvers having respective control shafts rigidly carried by and extending longitudinally from respective aligned ends of said louvers, and said angle varying means being operatively associated with said control shafts.

32. The solar energy system of claim 31 wherein said angle varying means comprises:

first and second generally oppositely directed louver tilting arms rigidly carried by and extending radially from each of said control shafts, said first louver tilting arms being parallel and aligned, and said second louver tilting arms being parallel and aligned;

an upper pivot shaft rotatable but in fixed location with respect to said chamber generally parallel to said control shafts and above said louvers;

a lower pivot shaft rotatable but in fixed location with respect to said chamber generally parallel to said control shafts and below said louvers;

first and second generally oppositely directed pivot shaft tilting arms rigidly carried by and extending radially from each of said pivot shafts, said first pivot shaft tilting arms being generally parallel to and aligned with said first louver tilting arms, and said second pivot shaft tilting arms being generally parallel to and aligned with said second louver tilting arms;

taut first connecting means pivotally fixed to said first pivot shaft tilting arms and slidably pivotally connected to said first louver tilting arms;

taut second connecting means pivotally fixed to said second pivot shaft tilting arms and slidably pivotally connected to said first louver tilting arms;

means for selectively rotating one of said pivot shafts.

33. The solar energy system of claim 31 further comprising means defining a control compartment adjacent one side of said chamber, said control shafts extending into said control compartment and said angle varying means being disposed in said control compartment.

34. The solar energy system of claim 33 further comprising a partition wall between said control compartment and said chamber, said partition wall having a generally vertical slot therethrough, a deformable seal means mounted in and substantially filling said slot, said control shafts extending through said seal means, and said seal means sealing around each of said control shafts while still allowing rotation of said control shafts.

* * * * *